United States Patent
Spellman et al.

(10) Patent No.: US 7,400,139 B2
(45) Date of Patent: Jul. 15, 2008

(54) CONTACTLESS HALL-EFFECT ANGULAR POSITION SENSOR

(75) Inventors: Charles Spellman, Yorktown, VA (US); Brian G. Babin, Bristol, IN (US); John K. Narney, II, Yorktown, VA (US)

(73) Assignee: Continental Automotive Systems US, Inc., Auburn Hills ( * ) Notice: Subject to any disclaimer, the term of this patent is extended or adjusted under 35 U.S.C. 154(b) by 107 days.

(21) Appl. No.: 11/402,671

(22) Filed: Apr. 12, 2006

(65) Prior Publication Data
US 2007/0029996 A1 Feb. 8, 2007

Related U.S. Application Data

(60) Provisional application No. 60/704,744, filed on Aug. 2, 2005.

(51) Int. Cl.
G01B 7/30 (2006.01)
G01R 33/07 (2006.01)
H01L 43/06 (2006.01)

(52) U.S. Cl. .................. 324/207.25; 324/207.2

(58) Field of Classification Search ......... 324/207.2, 324/207.21, 207.23, 207.25; 33/1 PT
See application file for complete search history.

(56) References Cited

U.S. PATENT DOCUMENTS

| 4,763,877 | A  * | 8/1988  | Kennedy ............... 251/362 |
| 6,513,753 | B1 * | 2/2003  | Toni et al. ............ 244/17.27 |
| 6,693,421 | B2 * | 2/2004  | Wolf .................... 324/207.2 |
| 6,847,205 | B2 * | 1/2005  | Puech ................. 324/207.25 |
| 6,922,052 | B2 * | 7/2005  | Steinruecken et al. .. 324/207.2 |
| 2004/0227506 | A1 * | 11/2004 | Shimomura et al. ..... 324/207.2 |
| 2006/0220638 | A1 * | 10/2006 | Urquidi et al. ........ 324/207.25 |

FOREIGN PATENT DOCUMENTS

JP 405126513 * 5/1993 ............ 324/207.25

* cited by examiner

Primary Examiner—Reena Aurora
Assistant Examiner—Kenneth J Whittington

(57) ABSTRACT

An example angular position sensor assembly includes a sector member that rotates within a ring including a permanent magnet disposed centrally within the ring and a Hall-effect sensor adjacent the permanent magnet on an opposite side of the permanent magnet from the sector member.

14 Claims, 2 Drawing Sheets

US 7,400,139 B2

CONTACTLESS HALL-EFFECT ANGULAR POSITION SENSOR

CROSS REFERENCE TO RELATED APPLICATION

The application claims priority to U.S. Provisional Application No. 60/704,744 which was filed on Aug. 2, 2005.

BACKGROUND OF THE INVENTION

This invention generally relates to an angular position sensor. More particularly, this invention relates to an angular position sensor including a Hall-Effect sensor measuring changes in a magnetic field caused by a change in angular position.

An angular position sensor includes a magnetic source generating a magnetic field disposed within a ferrous ring. A flux guide rotates within the ring between the ring and the magnetic source. A Hall-effect cell is disposed between the flux guide and the ring to sense changes in the magnetic field caused by rotation of the flux guide relative to the ring and the magnetic source. The Hall Effect cell is disposed within a magnetic flux path between the flux guide and the ring to provide optimal exposure to the magnetic field that in turn provides the desired accuracy of the sensor.

Disadvantageously, the size of the sensor is limited by the size of the Hall Effect cell. As the size of the sensor decreases, so does the gap between the flux guide and the ring. However, the Hall-effect cell cannot be reduced in size proportionate to the reduction in the gap. For this reason, the size of the sensor is limited by the size of the Hall-effect cell, as decreasing air gaps prevent installation of the Hall-effect cell between the flux guide and the ring.

Accordingly, it is desirable to develop and design a sensor that can be sized to fulfill application specific needs independent of the size of the Hall Effect cell.

SUMMARY OF THE INVENTION

An example angular position sensor assembly includes a sector member that rotates within a ring including a permanent magnet disposed centrally within the ring and a Hall-effect sensor disposed on an opposite side of the permanent magnet from the sector member.

The ring defines a first plane transverse to a first axis. The sector member rotates within the first plane about the first axis in a space between the ring and the magnet. The magnet generates a magnetic field within a magnetic circuit including the ring and the sector member. Movement of the sector member relative to the ring, and the magnet causes changes in the magnetic field that are sensed by the Hall-effect sensor. The Hall-effect sensor is disposed on an opposite side of the permanent magnet from the sector member and spaced a desired distance from the permanent magnet.

The Hall-effect sensor is disposed outside of the space between the sector member and the ring providing for smaller outer diameters of the ring and thereby a smaller overall sensor assembly.

These and other features of the present invention can be best understood from the following specification and drawings, the following of which is a brief description.

DETAILED DESCRIPTION OF THE PREFERRED EMBODIMENT

Figure 1:
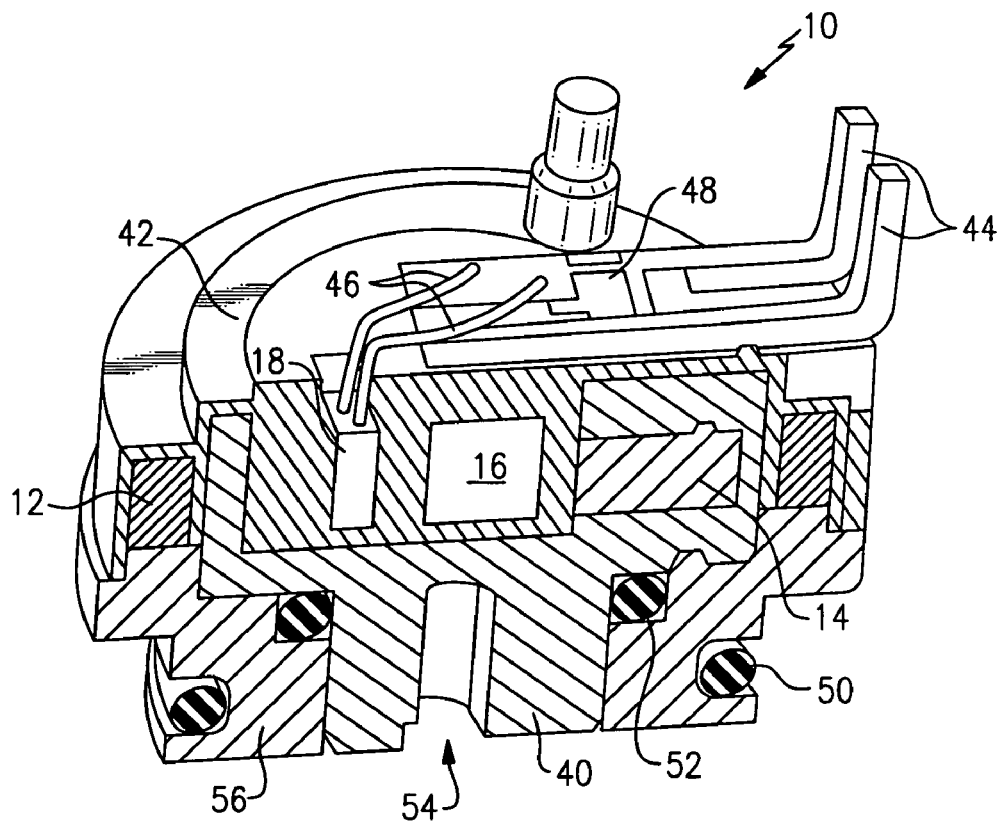
FIG. 1 is a perspective view of an example angular position sensor assembly according to this invention.

Referring to FIG. 1, an example angular position sensor assembly 10 includes a ferrous ring 12 supported within a non-magnetic housing 42. The housing 42 also supports a magnet 16 and a Hall-effect sensor 18. A sector member 14 is supported for movement relative to the housing 42 and thereby the ring 12 within a drive arm 40. The drive arm 40 is fabricated from non-magnetic material and is supported between the housing 42 and a base 56. The base 56 includes seals 50 and 52 for preventing moisture or other contaminants into the internal workings of the sensor assembly.

The drive arm 40 is rotated by an external device (not shown) to detect and provide desired position information indicative of such movement. Rotation of the drive arm 40 causes rotation of the sector member 14 relative to the ring 12 and the magnet 16. The movement of the sector member 14 generates changes in a magnetic field that is sensed by the Hall-Effect sensor 18. The Hall-effect sensor 18 generates electrical signals that are communicated to a desired controller (not shown) through terminals 44. The Hall-effect sensor 18 includes leads 42 that are electrically attached to the terminals 44. The terminals are mounted to the housing 42 by a heat stake 48. The heat stake 48 holds the terminals 44 in a desired orientation without requiring additional fasteners.

Figure 2:
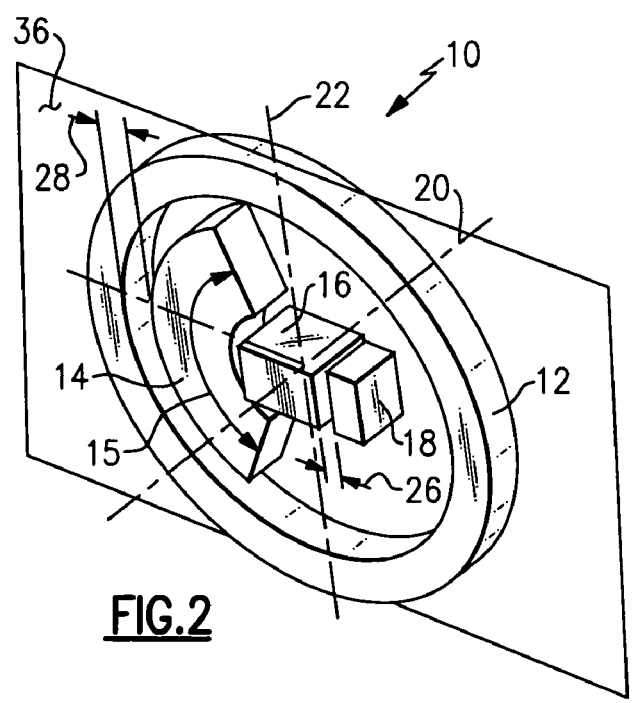
FIG. 2 is a schematic view of the example angular position sensor.

Referring to FIG. 2, the angular position sensor assembly 10 is shown removed from the housing 42 and other support elements illustrated in FIG. 1. The ring 12 is disposed concentrically about a first axis 20. The ring 12 surrounds the sector member 14 that is rotatable within the ring 12 about the first axis 20 and relative to the magnet 16. The sector member 14 is radially shaped in a sector manner that extends an angular span indicated at 15. The example angular span is approximately 140°. As appreciated, other angular spans are within the contemplation of this invention. The example magnet 16 is a permanent magnet disposed centrally within the ring 12 and the first axis 20.

The ring 12 defines a first plane 36 transverse to the first axis 12 and parallel to a second axis 22. The sector 14 rotates within the first plane and the ring 12 in a space between the ring 12 and the magnet 16. The magnet 16 generates a magnetic field that creates a magnetic circuit including the ring 12 and the sector member 14. Both the ring 16 and the sector member 14 are fabricated from a ferrous material possessing desirable magnetic properties.

The sector 14 rotates relative to the ring 12 and causes changes in the magnetic field that are sensed by the Hall-effect magnetic field sensor assembly 18. The Hall-effect sensor 18 is disposed within the plane 36 and ring 12 on a side of the magnet 16 opposite the sector member 14. The Hall-effect sensor 18 is spaced apart from the magnet 16 a distance 26. The distance 26 between the Hall-effect sensor 18 and the magnet 16 is determined to provide a desired accuracy in sensing the magnetic field. This placement of the Hall-effect sensor 18 is outside a gap 28 between the ring 12 and the sector member 14. Rotation of the sector 14 relative to the magnet 16 causes changes to the magnetic field that are detected by the Hall-effect sensor 18. The changes in the magnetic field detected by the Hall-effect sensor 18 are indicative of rotation of the sector 14 relative to the ring 12.

Placement of the Hall-effect sensor 18 outside of the gap 28 removes size limitations on the gap 28 between the ring 12 and the sector member 14. Movement of the sector member 14 does not selectively block or unblock direct exposure to the magnet 16 as would be the case with the Hall-effect sensor 18 were disposed between the ring 12 and the sector member 14. Accordingly, changes to the magnetic field caused by the relative position of the sector member 14 relative to the ring are measured without the added factor of blocking or unblocking direct exposure to the magnet 16 as is the case in conventional sensor assemblies.

Figure 3:
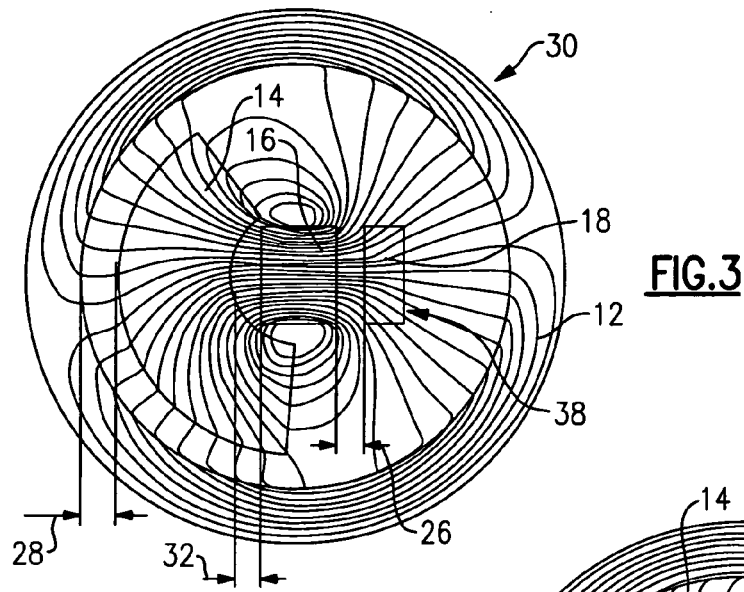
FIG. 3 is a schematic view illustrating an example magnetic circuit of the example angular position sensor.

Referring to FIG. 3, lines of magnetic flux 30 indicative of the magnetic field produced by the magnet 16 form a magnetic circuit between the ring 12, sector member 14 and the magnet 16. The magnetic field within the ring 12 and the sector member 14 are sensitive to the position of the gap 32 between the magnet 16 and the sector member 14, and the gap 28 between the ring 12 and the sector member 14.

Changes to the sensor assembly size for a desired application are accomplished by proportionally changing the size of the components while maintaining a proportionate spatial relationship between the various components. Meaning the gaps 28, 32 and 26 are maintained in a proportional manner no matter what size the ring 12.

The Hall-effect sensor 18 limits the overall size of sensor assembly, as the hall-effect sensor 18 is limited in how small it can be made and still work effectively. Accordingly, for conventional sensors, the Hall-effect sensor disposed within the gap 28 governs the smallest practical size of the sensor assembly. Changes to the proportionate size of the gap 28 relative to the ring 12 and sector member 14 can reduce accuracy of a sensor assembly to undesirable levels. The example Hall-effect sensor 16 is placed outside of the gap 28, so smaller outer diameters of the ring 12 are available without modifying the proportional relationship between the ring 12, the magnet 16 and the sector member 14.

Figure 4:
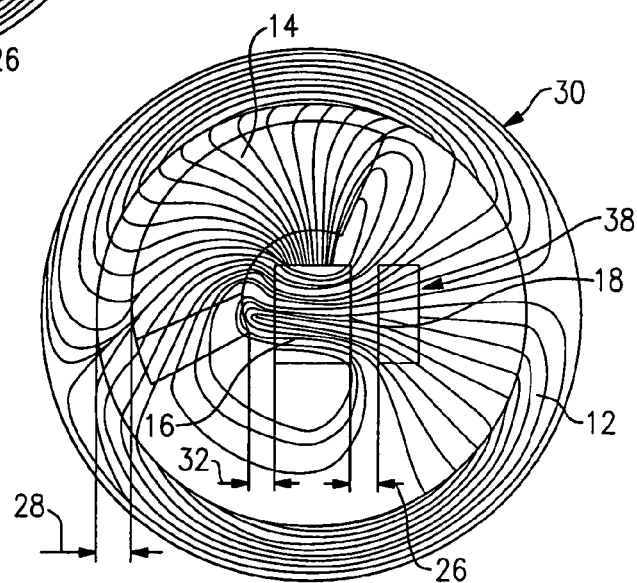
FIG. 4 is a schematic view illustrating the example magnetic circuit relative to a position of the example sector member.
Figure 5:
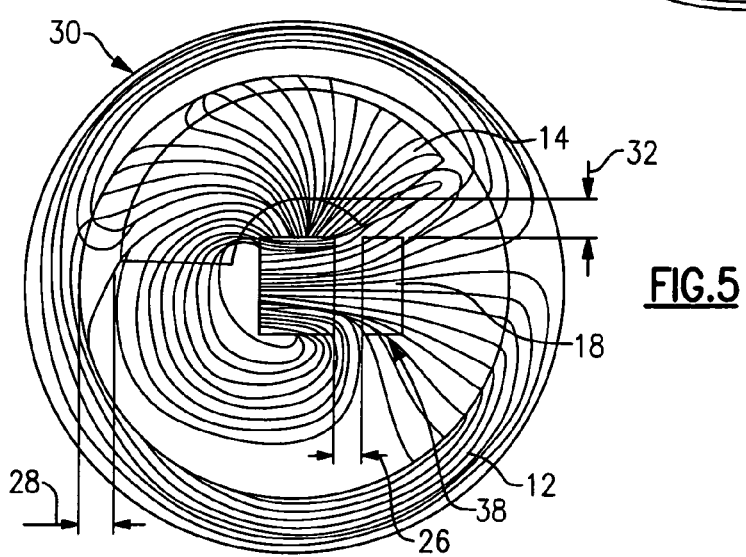
FIG. 5 is another schematic view illustrating the example magnetic circuit relative to a position of the example sector member.

Referring to FIGS. 4 and 5 with continuing reference to FIG. 3, the magnetic field is substantially disposed within the plane 36 and the strength of that magnetic field is changed proportionally, by rotation of the sector member 14. The sector member 14 is rotatable within a radial range of approximately 2200°. This provides approximately 110° of travel in each direction. Movement of the sector member 14 changes the strength of the magnetic field 38 that passes through the Hall-Effect sensor 18. The changes in magnetic field strength sensed by the Hall-Effect sensor 18 are indicative of angular position.

The example angular sensor assembly 10 provides for a ring 12 having an outer diameter smaller than conventional angular position sensors utilizing a Hall-effect sensor within the magnetic flux path between the ring 12 and the sector member 14. The sensor assembly 10 of this invention provides for the use of a desired spatial relationship between the ring 12, sector member 14 and magnet 16 that yields desired accuracies in measuring angular position without substantially limiting sensor assembly size.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An angular position sensor assembly comprising:
   a ring comprised of a ferromagnetic material centered on an axis;
   a magnetic source disposed within the ring;
   a sector member disposed within the ring and movable about the axis within the ring; and
   a Hall-Effect sensor disposed on a side of the magnetic source opposite the sector member and within the magnetic flux path between the magnetic source and the ring, wherein the magnetic source is disposed at a center point within the ring, and the sector member rotates about the magnetic source within the ring.

2. The assembly as recited in claim 1, including a gap between the Hall-Effect sensor and the magnetic source, wherein no portion of either the ring or the sector member are disposed within the gap.

3. The assembly as recited in claim 1, wherein the ring and sector member define a magnetic flux path disposed within a plane.

4. The assembly as recited in claim 3, wherein the Hall-Effect sensor measures changes in a magnetic field produced by the magnetic source responsive to movement of the sector member.

5. The assembly as recited in claim 3, including an annular gap disposed between the sector member and the ring, wherein the annular gap is disposed within the plane.

6. The assembly as recited in claim 1, including a drive arm comprised of substantially non-magnetic material supporting the sector member within the ring.

7. The assembly as recited in claim 6, wherein the ring, magnetic source and Hall-Effect sensor are supported within a non-magnetic housing.

8. The assembly as recited in claim 7, including terminals in electrical communication with the Hall-Effect sensor and supported in a desired position on the housing.

9. An angular position sensor assembly comprising:
   a ring comprised of a ferromagnetic material centered on an axis;
   a magnetic source disposed within the ring, wherein the magnetic source is disposed at a center point within the ring, and the sector member rotates about the magnetic source within the ring;
   a sector member disposed within the ring and movable about the axis within the ring, wherein the ring and sector member define a magnetic flux path disposed within the plane; and
   a Hall-Effect sensor disposed on a side of the magnetic source opposite the sector member to measure changes in a magnetic field produced by the magnetic source responsive to movement of the sector member, wherein the Hall-Effect sensor is disposed within the magnetic flux path between the magnetic source and the ring.

10. An angular position sensor assembly comprising:
    a ring centered about an axis;
    a sector member supported for rotation about the axis by a drive arm;
    a magnet centered within the ring along the axis;
    a Hall-effect sensor spaced apart from the magnet and disposed on a side of the magnet opposite the sector member; and
    a housing supporting the ring, magnet and Hall-Effect sensor in a desired spatial relationship.

11. The assembly as recited in claim 10, wherein the sector member extends over an angle of about 140°.

12. The assembly as recited in claim 10, including a base attached to the housing for supporting rotation of the drive arm relative to the ring and the housing.

13. The assembly as recited in claim 10, including an air gap between the Hall-effect sensor and the magnet where no portion of either the ring or the sector member are disposed within the air gap.

14. The assembly as recited in claim 10, wherein the sector member is rotatable relative to the ring and the magnet, and the magnetic flux path changes responsive to rotation of the sector member.

* * * * *